Feb. 15, 1966     J. W. MERRITT     3,235,187
DROP STABILIZER
Filed Oct. 18, 1963
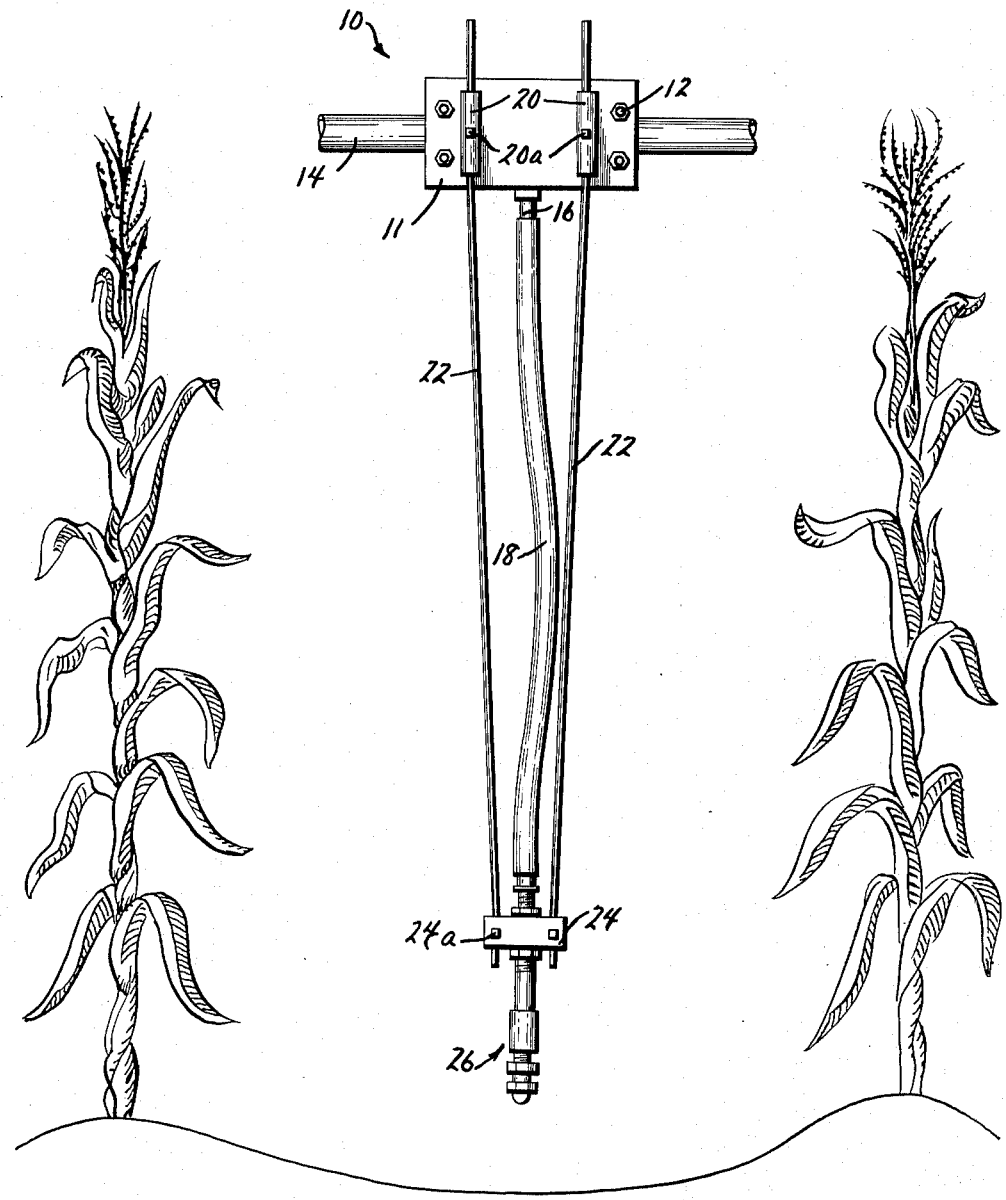
INVENTOR.
JOSEPH W. MERRITT
BY
Attorney ively spray growing crops for the control of insects or pests,

United States Patent Office 3,235,187
Patented Feb. 15, 1966

3,235,187
DROP STABILIZER
Joseph W. Merritt, Evansville, Ind., assignor to Hahn, Inc., Evansville, Ind., a corporation of Indiana
Filed Oct. 18, 1963, Ser. No. 317,361
1 Claim. (Cl. 239—588)

The present invention broadly relates to the spraying of cultivated crops, and more particularly to a new and novel drop stabilizer which has particular application for use with farm vehicles or the like.

As is known, it is the common practice to selectwhere it is particularly desirable to provide for the spraying of chemicals for such purposes between successive rows of the crops and below the lower leaf level thereof. In this latter regard, indiscriminate high spraying oftentimes harms the growing crop and curtails the harvest potential.

Prior spraying devices were mostly universal, i.e. capable of movement throughout 360° from the point of suspension thereof. Such prior arrangements proved unsatisfactory, however, in that positive spray control was lacking, and undesirable spraying of the growing crop was oftentimes the result.

By virtue of the instant invention, the applicant herein has invented a drop stabilizer type sprayer which, because of its new and novel structure, is movable forwardly and rearwardly along the path of movement of the vehicle to which it is mounted, with any undesirable lateral movement being precluded. Additionally, because of the advantageous arrangement provided by the instant sprayer structure, any obstacles encountered during its normal path of travel are readily passed over without operational consequences.

Briefly, the instant invention employs a hollow supply boom from which chemical spray conventionally passes into a flexible hose and, thereafter, from a commonly known nozzle arrangement onto the crops. The latter is positively positioned, however, through the use of spring steel support members which extend in a generally vertical path, defining a stabilized structure, which is mainly restricted to forward and rearward movement with respect to the path of travel of a vehicle to which the sprayer is attached, and mostly incapable of undesired lateral movement towards adjacent rows of crops.

Accordingly, the principal object of the present invention is to provide a new and novel drop stabilizer type of sprayer device for agricultural use.

Another object of the present invention is to provide a new and novel agricultural insect or pest control device which is positively maintained at a desired spraying position.

A further and more general object of the present invention is to provide a drop stabilizer sprayer for agricultural chemicals which, when positioned for use, is movable forwardly and rearwardly with respect to path of travel of the vehicle to which it is attached, but where lateral movement is precluded; which is made from a minimum number of operable components; and, which is readily manufactured as well as installed for use.

Other objects and a better understanding of the present invention will become more apparent from the following description, taken in conjunction with the accompanying drawing, wherein the figure is a front plan view of the instant drop stabilizer sprayer in a typical position for use.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawing, the applicant's new and novel drop stabilizer sprayer 10 comprises, in a typical embodiment of the invention, an upper member 11 commonly secured, by U-bolts 12, to a conventional boom 14 positioned on an agricultural vehicle. The boom 14, commonly known in the art, provides a passageway for chemical spray, used in insect control, from a reservoir (not shown) through a T-joint (disposed behind the upper member 11) to a fitting 16 onto which a well-known flexible hose 18 is secured.

Disposed on the upper member 11, as by welding, for example, are collars 20, each having a screw type positioning element 20a forming a part thereof. Each of the collars 20 is adapted to receive a supporting member or rod 22, which extends therethrough, and which is selectively positioned by means of the positioning element 20a. In a preferred embodiment of the invention, each of the bands 22 is made from spring steel, typically having a circular cross-section.

The lower end of each supporting member or rod 22 is adapted to extend through an opening in a lower member 24, also having a screw type positioning element 24a forming a part thereof. The lower member 24 is adapted to position, as by welding, for example, a conventional nozzle arrangement 26, to which the flexible hose 18 is connected, where the nozzle arrangement 26 typically includes spray orifices proximate the lower end thereof.

The preceding relationship of the upper member 11, the lower member 24, and the supporting members 22 provides a stabilized assembled unit having a characteristic trapezoidal shape in one form of the invention. In view thereof, and in that the boom 14 is normally positioned across the rear of the agricultural vehicle to which it is secured, the aforesaid elements defining the instant drop stabilizer move only forwardly and rearwardly with respect to the path of travel of such agricultural vehicle, and not laterally, i.e. in the direction of the longitudinal axis of the boom, providing, thereby, high advantage to the user.

In use, the upper member 11 is disposed on the boom 14, and the upper ends of the supporting members 22 are caused to extend through the collars 20 thereof. On the other hand, the lower ends of the supporting members 22 extend through the openings in the lower member 24. Adjustment in a vertical direction is achieved through loosening and tightening of the screw type positioning elements 20a and 24a, so that, along with the position of the boom, the nozzle arrangement 26 is disposed heightwise, where desired, between the rows of the growing crop.

As the agricultural vehicle moves, chemical passes through the boom 14, the T-joint (not shown), the fitting 16, the flexible hose 18 and from the spray nozzle arrangement 26. As indicated, the instant drop stabilizer moves only forwardly and rearwardly with respect to the path of travel of the agricultural vehicle, and as lateral movement in the direction of the crops is not possible, a high degree of spraying control is achieved. Moreover, the aforesaid flexibility of the instant drop stabilizer along the path of movement of the agricultural vehicle permits same to readily pass over any obstacles which may be encountered, such as stones, for example, without damage to the unit.

Thus, from the preceding, it should be apparent that the applicant has provided a new and novel drop stabilizer for agricultural purposes which is highly effective in controlling spraying action, in that positive positioning of the spray nozzle is continually achieved. As noted, the instant drop stabilizer is so arranged that the spray nozzle is prohibited from lateral movement, i.e. in the direction of the crops being sprayed, but, instead, moves in a selected path defined as forwardly and rearwardly along the direction of movement of the vehicle on which the drop stabilizer is conventionally positioned.

The drop stabilizer described above is, of course, susceptible to various changes within the spirit of the invention. For example, proportioning can be modified, as desired, as well as the particular structure for maintaining the spring steel supporting members in the desired operative position. Thus, the preceding description should be considered illustrative, and not as limiting the scope of the following claim.

I claim:

An agricultural spray nozzle support assembly comprising a boom, a framework depending from said boom, said framework having an upper member defining one end and mounted on said boom, a lower member defining an opposite end, flexible resilient members extending from said upper member to said lower member, and means mounting said resilient flexible members between said upper member and said lower member in a converging relationship whereby frontward and backward movement of said lower member in the direction of travel of said boom is allowed while sideward movement of said lower member in a direction transverse to the direction of travel of said boom is inhibited, and a spray nozzle positioned on said lower member.

References Cited by the Examiner
UNITED STATES PATENTS

| | | | |
|---|---|---|---|
| 383,740 | 5/1888 | Lovejoy | 239—175 |
| 555,147 | 2/1896 | Burck | 239—588 |
| 805,579 | 11/1905 | Patchen | 246—75 |
| 1,014,507 | 1/1912 | North | 239—175 |
| 2,501,555 | 3/1950 | White | 239—175 |
| 2,574,206 | 11/1951 | Browning | 239—162 |
| 2,706,133 | 4/1955 | North et al. | 239—588 |
| 3,117,725 | 1/1964 | Palmer | 239—162 |

M. HENSON WOOD, Jr., *Primary Examiner.*

EVERETT W. KIRBY, *Examiner.*